United States Patent [19]

Takeuchi et al.

[11] Patent Number: 4,955,415
[45] Date of Patent: Sep. 11, 1990

[54] PNEUMATIC RADIAL TIRE WITH GROOVE PLATFORMS TO PREVENT STONE ENTRAPMENT

[75] Inventors: Akihiro Takeuchi; Toshio Koyama, both of Kobe, Japan

[73] Assignee: Sumitomo Rubber Industries, Ltd., Hyogo, Japan

[21] Appl. No.: 193,762

[22] Filed: May 13, 1988

Related U.S. Application Data

[63] Continuation-in-part of Ser. No. 905,153, Sep. 9, 1986, abandoned.

[30] Foreign Application Priority Data

Sep. 10, 1985 [JP] Japan .................................. 60-201401

[51] Int. Cl.$^5$ .............................................. B60C 11/06
[52] U.S. Cl. ................................................ 152/209 R
[58] Field of Search ......... 152/209 R, 209 D, DIG. 1

[56] References Cited

U.S. PATENT DOCUMENTS

| | | | |
|---|---|---|---|
| 3,095,024 | 6/1963 | Robertson | 152/209 R |
| 4,423,760 | 1/1984 | Treues et al. | 152/209 R |
| 4,649,975 | 3/1985 | Kogure et al. | 152/209 R |
| 4,703,788 | 11/1987 | Kusube et al. | 152/209 R |

FOREIGN PATENT DOCUMENTS

| | | | |
|---|---|---|---|
| 227322 | 7/1987 | European Pat. Off. | 152/209 R |
| 92904 | 5/1985 | Japan | 152/209 D |
| 61807 | 3/1987 | Japan . | |

*Primary Examiner*—Michael W. Ball
*Assistant Examiner*—Geoffrey L. Knable
*Attorney, Agent, or Firm*—Birch, Stewart, Kolasch & Birch

[57] ABSTRACT

A pneumatic radial tire, in which stone entrapment in the tread groove is prevented and the wet grip property is maintained, comprising: a tread provided with a central longitudinal groove on the central part thereof; the central longitudinal groove extending continuously zigzag in the circumferential direction of the tire along the equator of the tire to form a plurality of angled portions of the central longitudinal groove, and the groove provided in each zigzag edge portion with a platform; the platform in each zigzag edge portion being formed on one side of the sidewalls which is located more closely to the tire equator than the other side. The depth of the platforms from the tread surface to the platforms is in a range of 40 to 80% of the depth of the central longitudinal grooves; the circumferential length of the platform is in a range of 15 to 40% of the zigzag pitch of the central longitudinal groove; and the width of the platforms is in a range of 5 to 20% of the width of the central longitudinal groove.

2 Claims, 4 Drawing Sheets

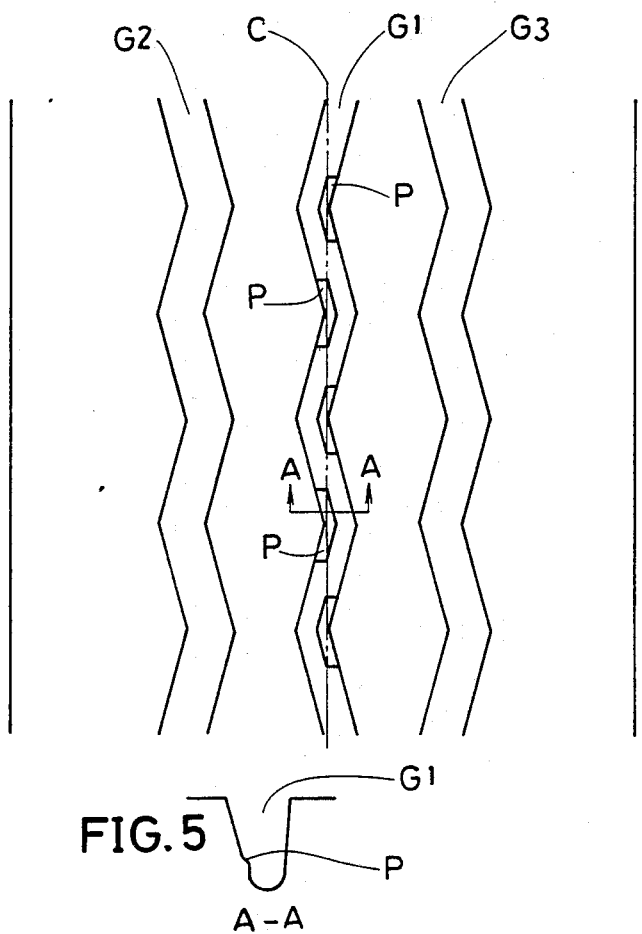

A-A

PNEUMATIC RADIAL TIRE WITH GROOVE PLATFORMS TO PREVENT STONE ENTRAPMENT

This application is a continuation-in-part of application Ser. No. 905,153 filed on Sept. 9, 1986, now abandoned.

BACKGROUND OF THE INVENTION

The present invention relates to a pneumatic radial tire, and more particularly to a tread pattern for pneumatic radial tires for trucks or buses, in which stone entrapment in the zigzag, grooves of the tread is prevented without loss of the wet grip property of the tire.

In a pneumatic raidal tire particularly one for heavy load use such as a radial tire for trucks or buses, stone entrapment in the tread grooves is liable to occur under dirt road running. If the tire runs continuously under such a condition, stones are entrapped in the tread grooves, which inflict cracks and other injuries to the tread grooves.

As countermeasures for such problems, there have been attempts to widen the tread grooves and to provide stepped sidewalls for the tread grooves in order to make it easy to discharge the trapped stones from the tread grooves and to prevent the groove bottom from being reached by the stones.

Such attempts, however, have disadvantages in that the wear resistance is lowered and the width of the tread grooves decreases as the tread wears out which reduces the wet grip property.

SUMMARY OF THE INVENTION

It is an object of the present invention to provide a pneumatic radial tire in which stone entrapment is suppressed without any sacrifice of wet grip property and wear resistance.

According to one aspect of the present invention, the pneumatic radial tire comprises:

a tread provided with a central longitudinal groove on the central part thereof;

the central longitudinal groove extending continuously zigzag in the circumferential direction of the tire along the equator of the tire to form a plurality of zigzag edge portions of the central longitudinal groove, and the central longitudinal groove provided in each zigzag edge portion having a platform;

the platform in each zigzag edge portion formed on one side of the sidewalls which is located more closely to the tire equator than to the other side;

the depth of the platforms from the tread surface to the platforms being in a range of 40 to 80% of the depth of the central longitudinal grooves;

the circumferential length of the platforms being in a range of 15 to 40% of the zigzag pitch of the central longitudinal groove; and the width of the platforms being in a range of 5 to 20% of the width of the central longitudinal groove.

BRIEF DESCRIPTION OF THE DRAWINGS

FIG. 4 is a plan view showing a tread pattern of another embodiment of the present invention;

FIG. 5 is a cross sectional view taken along the line A—A of FIG. 4;

DETAILED DESCRIPTION OF THE INVENTION

Figure 1:
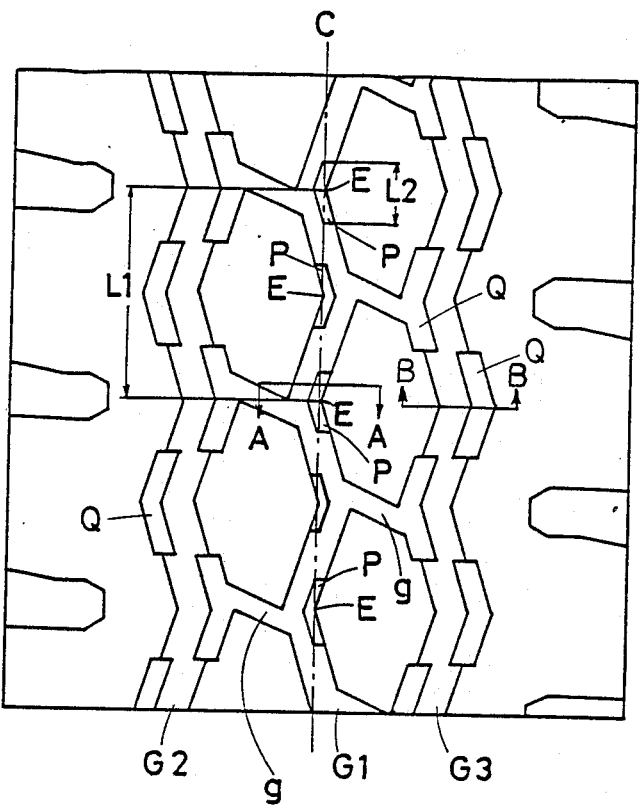
FIG. 1 is a plan view showing a tread pattern of an embodiment of the present invention.
Figure 2:
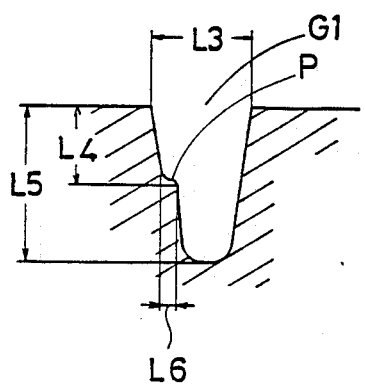
FIG. 2 is a cross sectional view taken along the line A—A of FIG. 1.
Figure 3:
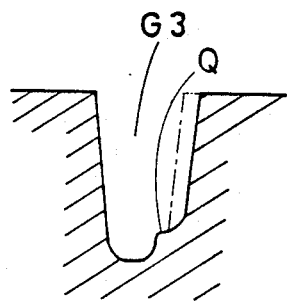
FIG. 3 is a cross sectional view taken along the line B—B of FIG. 1.

In the figures, the tread of the tire is provided with a zigzag central longitudinal groove G1 extending zigzag in the circumferential direction of tire along the tire equator C.

The above mentioned central longitudinal groove G1 is provided in zigzag edge portions E with a plurality of platforms P, whereby the stones trapped therein is capable of being easily discharged from zigzag edge portions E in consequence of the repeated deformation of the tread during the rotation of the tire.

Depth L4 of platforms P from the tread surface to platforms P is in a range of 40 to 80% of depth L5 of central longitudinal groove G1. If depth L4 is more than 80%, such a short platform is not capable of discharging the entrapped stones. If depth L4 is less than 40%, then it is difficult to discharge the stones because it becomes hard for the stones to move onto such a high platform.

Width L6 of platforms P is in a range of 5 to 20% of width L3 of central longitudinal groove G1. If width L6 is less than 5%, then it is very difficult to discharge the entrapped stones by such a narrow platform. If width L6 is more than 20%, then the drainage especially after the tread wears off, is lowered although the discharge is promoted.

Length L2 of platforms P in the circumferential direction of the tire is in a range of 15 to 40% of zigzag pitch L1 of central longitudinal groove G1. If length L2 is more than 40%, then the ends of the circumferentially adjacent platforms substantially overlap with one another, and the drainage or wet grip especially, is lowered after the tread wears off. If length L2 is less than 15%, then it becomes difficult to dishcarge the entrapped stones by such a small platform.

It has been known that the groove in which stone entrapment is most liable to occur under dirt road running is a zigzag central longitudinal groove which extends zigzag in the circumferential direction of the tire along the center line of the tread or the tire equator, and the frequency of the stone entrapment is particularly high in the zigzag edge portions of the groove. This fact may be logically explained by the postulate that the stone entrapped is forced to move toward the direction of the tire rotation by the friction of the stone with the road surface, and is stopped in the zigzag edge portion, and accordingly the stone is mainly entrapped in the zigzag edge portions.

It is therefore, a very important aspect of the present invention that platforms P, with the specific dimensions are formed only in the zigzag edge portions, but we found and even more important factor in preventing stone entrapment.

FIG. 4 shows a fundamental tread pattern according to the present invention, wherein the tread is provided with central longitudinal groove G1 with platforms P and two side longitudinal grooves G2 and G3 with no platform. In each zigzag edge portion of this example, one groove wall which protrudes into the groove is closer to tire equator C than the other groove wall which protrudes outwardly of the groove. Platforms P are provided on the groove walls which protrude into the groove. On the other hand, FIG. 6 shows the same tread pattern as the above-mentioned funadamental tread pattern except for the location of platforms P', wherein each platform P is provided on the groove wall which protrudes outwardly of the groove.

Figure 6:
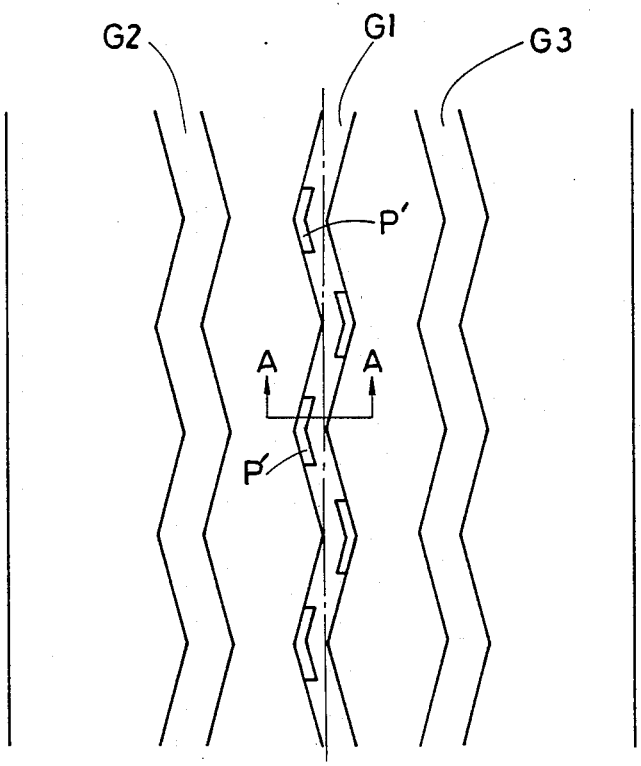
FIG. 6 is a plan view showing a tread pattern of a reference tire for comparison test.
Figure 7:
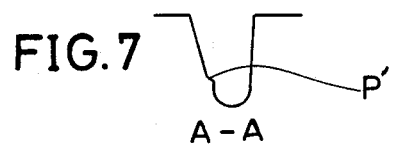
FIG. 7 is a cross sectional view taken along the line A—A of FIG. 5.

Test tires: example tires having the fundamental tread pattern of FIG. 4 and reference tires having the tread pattern of FIG. 6 were tested for stone entrapment, wherein the reference tires had the same structure as that of the example tires except for the location of platforms P' as described above.

Figure 8:
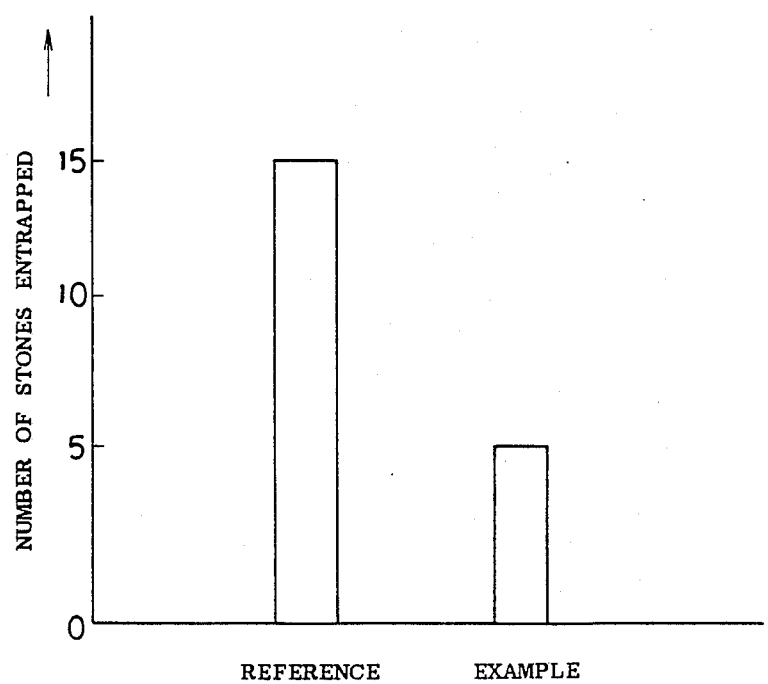
FIG. 8 is a bar graph showing the results of the comparison test.

The test tires were mounted on the rear wheels of a test vehicle and run on a 8-kilometer gravel road and subsequently a 6-kilometer asphalted road. And thereafter, the number of stones entrapped into the central longitudinal groove of each tire are counted, of which the average per tire are shown in FIG. 8. The test conditions are set out on Table 1.

TABLE 1

| | |
|---|---|
| Tire size | 10.00R20 |
| Internal pressure | 8.0 kgf/sq. cm |
| Rim size | 7.50V × 20 |
| Test vehicle | Dump truck |
| Gross weight | 12,000 kg |
| Speed | 60 km/hr (average) |
| Central longitudinal groove | |
| Zigzag pitch | 68.9 mm |
| Width | 10.5 mm |
| Depth | 16.0 mm |
| Platforms | |
| Length | 21.0 mm |
| Depth | 11.0 mm |
| Width | 1.0 mm |

As apparent from FIG. 8, the number of entrapped stones in the case in which the platforms are formed on the closer sides of the sidewalls are smaller than those in the case in which the platforms are formed on the reverse sides.

Since the goal of the present invention is to make the platforms as small as possible in dimensions and numbers, the most important aspect of the present invention is that the platform in each zigzag edge portion is formed on one side of the groove walls which is located more closely to the tire equator than the other side.

WORKING EXAMPLE

In FIG. 1 showing a preferred embodiment of the present invention, the tread is provided with zigzag central longitudinal grooves G1 and two zigzag side longitudinal grooves G2 and G3. The side longitudinal grooves are disposed on both sides of the central longitudinal groove, respectively, and extend zigzag in the circumferential direction of the tire with the same zigzag pitch, as the pitch of the central longitudinal groove, but a half pitch shifted.

In each zigzag edge portion E of central longitudinal groove G1, the platform P is formed on the groove wall which protrudes into the groove, whereby the stone entrapped therein is capable of being easily discharged easily from the zigzag edge portions E in consequence of the repeated deformation of the tread during the rotation of the tire.

The above mentioned central longitudinal groove G1 and side longitudinal grooves G2 and G3 are interconnected with lateral grooves g.

Lateral grooves g are parallel with each other, and each extends between the zigzag edge portion of central longitudinal groove G1 and the zigzag edge portion of side longitudinal groove G2, G3 so that one end of each lateral groove g is opened at the other groove wall with no platform in zigzag edge portions E of central longitudinal groove G1, whereby the sectional areas of the groove in portions E are substantially widened and drainage is maintained although the platform protrudes into the groove and the stone entrapment is further prevented.

The size of the tire is 10.00R20. Zigzag pitch L1 of central longitudinal groove G1 is 68.9 mm. Width L3 and depth L5 of central longitudinal groove G1 are 10.5 mm and 16.0 mm, respectively. Length L2, the depth L4 and width L6 of platforms P are 21.0 mm (30.0% of L1), 11.0 mm (68.8% of L5) and 1.0 mm (9.5% of L3), respectively. The width, the depth and the zigzag pitch of side longitudinal grooves G2 and G3 are 15.0 mm, 18.0 mm and 68.9 mm, respectively.

The above mentioned side longitudinal groove G2 and G3 have platforms Q formed intermittently on the zigzag edge portions of the side walls, so that platforms Q will alternately appear on the opposite sides of the sidewalls. The goal of this construction is also to prevent the side longitudinal grooves from stone entrapment, while at the same time, maintain the wet grip property.

In addition, the present invention can be applied effectively in all the tread patterns, such as rib pattern, rib-block pattern, rib-lug pattern and the like, having a central longitudinal groove extending along the equatorial plane of the tire.

As describred above, in the present invention, the zigzag central longitudinal groove extending along the equator of the tire is provided only in each zigzag edge portion with a platform, and the platform in each zigzage edge portion is formed on one side of the sidewalls which is located more closely to the tire equator than the other side, and further, the platforms have an optimum dimension.

Accordingly, the stones entrapped are discharged from the central longitudinal groove effectively by the platforms, and damage caused by the stones are prevented.

Further, good wet grip property is maintained even if the tread wears off due to the platforms having been made as small as possible in both dimension and numbers.

We claim:

1. A pneumatic radial tire having a tread provided with a central longitudinal groove on the central part thereof, side longitudinal grooves disposed on both sides of said central longitudinal groove, and lateral grooves connecting the central longitudinal groove with said side longitudinal grooves;

said central longitudinal groove extending continuously zigzag in the circumferential direction of the tire along the equator of the tire to form a plurality of zigzag angled portions of the central longitudinal groove, each angled portion of the central longitudinal groove provided with a platform formed on only one side of the groove sidewalls at the protruding point of the zigzag angled portion, said lateral grooves connecting the other side of the groove sidewalls of the central longitudinal groove opposite said platform with said side longitudinal grooves;

the depth of the platform from the tread surface to the platform being in a range of 40 to 80% of the depth of the central longitudinal groove;

the circumferential length of the platform being in a range of 15 to 40% of the zigzag pitch of the central longitudinal groove; and the width of the platform being in a range of 5 to 20% of the width of the central longitudinal groove.

2. The tire of claim 1, wherein the central longitudinal groove and the side longitudinal grooves extend in the circumferential direction of the tire.

* * * * *